Patented Oct. 15, 1935

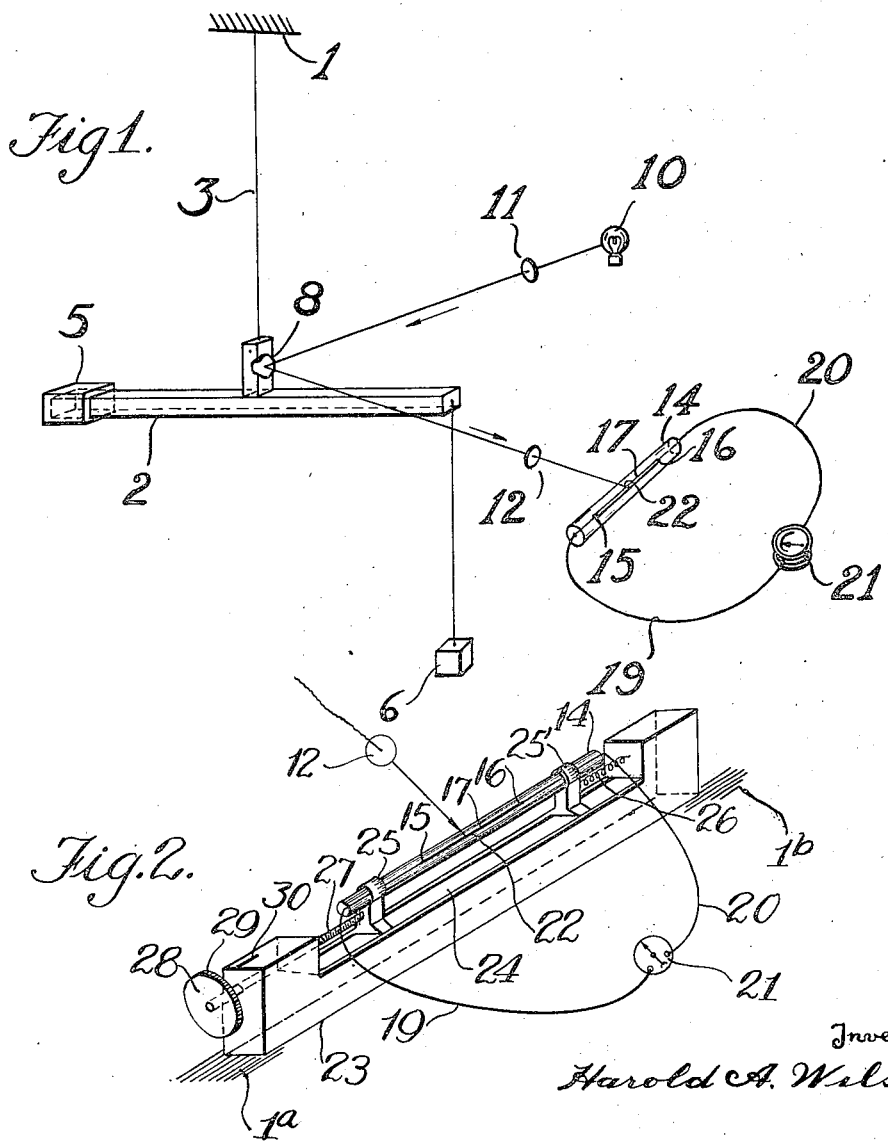

2,017,084

UNITED STATES PATENT OFFICE 2,017,084

VACUUM THERMOCOUPLE

Harold A. Wilson, Houston, Tex., assignor to Standard Oil Development Company, a corporation of Delaware Application November 27, 1931, Serial No. 577,512

3 Claims. (Cl. 177—351)

This invention relates to improvements in torsion balances. The invention will be fully understood from the following description taken in connection with the accomanying drawing in which Figure 1 is a diagrammatic view in perspective of the preferred apparatus for carryng out the invention, Fig. 2 is a similar view of the arrangement of the thermocouple and galvanometer when used as a null instrument.

Referring particularly to the drawing, reference numeral 1 designates a support for the torsion balance. The torsion balance comprises a bar or scale beam 2, which is suspended at an intermediate portion by a torsion wire 3. The bar 2 is weighted by a weight 5, affixed directly to one end of the bar, and by a weight 6, suspended from the opposite end of the bar. A mirror 8 is rigidly affixed to the bar. The torsion wire 3 can be formed of tungsten or other suitable material. When formed of tungsten the torsion wire preferably has a gauge of over 0.0015". The torsion balance, constructed as above described, has a period of less than approximately 3 minutes. If a torsion wire formed of other material than tungsten is used it can be made of larger gauge than 0.0015" to attain the period of less than approximately 3 minutes. It will be understood that a torsion wire having a gauge of less than 0.001", such as is commonly used in the relatively long period instruments previously constructed, can be used and some of the advantages of the invention will be retained.

The amount of deflection of the bar 2 of the torsion balance is indicated by the following arrangement of parts:

Radiant energy abundant in heat rays is generated by a hot filament, such as a lamp 10. An optical system, including the lens 11, directs the radiant energy to the mirror 8 and includes a lens 12 which focuses the radiant energy reflected from mirror 8 so that the reflected rays are directed operatively upon a vacuum thermocouple. The vacuum thermocouple includes an evacuated tube 14. Tube 14 contains the thermal junctions 15 and 16 which are connected by a metal member 17 formed of wire or metal strip which is covered with platinum black for the absorption of heat rays. The thermal junctions 15 and 16 are connected by means of the wires 19 and 20 through the walls of the tube 14 to a galvanometer 21. Member 17 is of a different metal than wires 19 and 20. The image indicated at 22 of the hot filament of the lamp 10 is focused on the wire or metal strip. Whenever the radiant energy falls upon lens 12 and strikes the thermocouple at any point 22 the heat is conducted away from the point 22 toward the two junctions 15 and 16; if the point 22 is nearer to one junction than to the other, the nearer junction becomes the hot junction of the thermocouple and the farther one the cold junction. We have, then, a thermocouple with two junctions at different temperatures, and therefore current will flow through the galvanometer 21. As a result of this construction one of the thermal junctions 15 and 16, will be at a higher temperature than the other if the image of the filament is other than midway between the thermal junctions. If the image of the filament is midway between the junctions, the temperatures of the thermal junctions will be equal and no current flows through the galvanometer. The thermo-electromotive forces generated when the thermal junctions are at different temperatures cause the flow of an electric current which is measured by means of the calibrated galvanometer 21. The galvanometer is calibrated in conjunction with the torsion balance so that the deflections of the galvanometer are exactly reducible to deflections of the torsion balance.

By the construction described a torsion balance is obtained, having a relatively short period, consequently the time of observation at a station is correspondingly reduced and thereby vicious effects of temperature changes of the deflections are decreased. The heavier torsion wire is relatively strong and consequently the life of the instrument is prolonged. The accuracy of reading of the deflections of a torsion balance is increased over 300 times. By using a galvanometer for obtaining the readings the observer is enabled to stand at considerable distance from the torsion balance and consequently the effect of the observer on the balance is eliminated.

Fig. 2 shows the arrangement of the thermocouple and galvanometer when used as a null instrument. The thermocouple tube 14 is mounted on the bar 23, having a groove 24, by means of sliding clamps 25 and 25'. At one end of the bar the compression spring 26 is placed between a suitable projection at the end of the bar 23 and the clamp 25'. At the other end of the bar there is a screw 27, one end of which is in contact with the clamp 25, while the other end is provided with a disk 28 having lines 29 engraved on its circumference. A line 30 on the bar serves as a fiducial zero. The bar is fastened to the torsion balance case at points 1a and 1b.

The operation is as follows: The observer adjusts the position of the thermocouple 14 by means of the screw 27 until there is no current through the galvanometer 21. As stated above, the radiant energy through lens 12 will then strike the thermocouple strip 17 at the point 22 exactly midway between the two junctions 15 and 16. The position of the dial with respect to the line 30 is then recorded by observing the line 29 which coincides with the line 30 produced. The same procedure is repeated for the other two azimuths which are necessary to complete the station. The instrument is then moved to a new station and the thermocouple again adjusted at each azimuth for zero current. The difference between the readings of the line 29 with respect to the reference line 30 for the same azimuth at two stations is then in direct proportion to the angles through which the balance beam was rotated.

The motion of the thermocouple may be brought about from a distance by suitable means so that it will not be necessary for the observer to be near the instrument while the balance is being read. It is understood that there are other ways of using the vacuum thermocouple in connection with a torsion balance and such uses are intended to be embraced within the scope of this invention.

This invention is not to be limited by any theory or the particulars given by way of illustration but only by the following claims in which it is my intention to claim all novelty inherent in the apparatus.

I claim:

1. In combination with a vacuum thermocouple comprising an evacuated tube having a transparent face, a metal strip in the tube adapted to absorb heat rays, wires of different material than the strip forming thermal junctions with spaced portions of the strip within the tube so that heat applied to a localized portion of the strip nearer one junction than the other heats the nearer junction hotter than the other and creates an electric current, means connected to the wires for indicating the current, and means including an oscillatory member mounted for directing heat rays upon the localized portion of the strip in an oscillatory path extending longitudinally of the strip whereby optimum current is developed at the ends of the period of the oscillatory member.

2. In combination with a vacuum thermocouple comprising an evacuated tube having a transparent face, a metal strip in the tube adapted to absorb heat rays, wires of different material than the strip forming thermal junctions with spaced portions of the strip within the tube so that heat applied to a localized portion of the strip nearer one junction than the other heats the nearer junction hotter than the other and creates an electric current, means connected to the wires for indicating the current, a source of heat rays, and a mirror mounted for oscillation for directing the heat rays upon a localized portion of the strip in an oscillatory path extending longitudinally of the strip whereby optimum current is developed at the ends of the period of the mirror.

3. In combination with a vacuum thermocouple comprising an evacuated tube having a transparent face, a metal strip in the tube adapted to absorb heat rays, wires of different material than the strip forming thermal junctions with spaced portions of the strip within the tube so that heat applied to a localized portion of the strip nearer one junction than the other heats the nearer junction hotter than the other and creates an electric current, means connected to the wires for indicating the current, a source of heat rays, a mirror, and means for oscillating the mirror at a given period for directing the heat rays upon the localized portion of the strip in an oscillatory path extending longitudinally of the strip whereby optimum current is developed at the ends of the period of the mirror.

HAROLD A. WILSON